United States Patent
Seddiq et al.

(10) Patent No.: US 10,837,858 B2
(45) Date of Patent: *Nov. 17, 2020

(54) METHOD AND SYSTEM FOR PROVIDING A TIME-BASED SCHEDULE FOR MONITORING ONE OR MORE PROPERTIES OF AN ASSET USING A PLURALITY OF MOBILE SENSOR NODES IN A WIRELESS SENSOR NETWORK

(71) Applicant: The King Abdulaziz City for Science and Technology, Riyadh (SA)

(72) Inventors: Yasser Mohammad Seddiq, Riyadh (SA); Mohammed Sulaiman BenSaleh, Riyadh (SA); Syed Manzoor Qasim, Riyadh (SA); Abdulfattah M Obeid, Riyadh (SA); Ahmad Yahya Al-nasheri, Riyadh (SA); Ahmad Masha Alotaibi, Riyadh (SA); Abdulaziz S Almazyad, Riyadh (SA)

(73) Assignee: The King Abdulaziz City for Science and Technology, Riyadh (SA)

( * ) Notice: Subject to any disclaimer, the term of this patent is extended or adjusted under 35 U.S.C. 154(b) by 399 days.

This patent is subject to a terminal disclaimer.

(21) Appl. No.: 14/936,249

(22) Filed: Nov. 9, 2015

(65) Prior Publication Data
US 2017/0131173 A1    May 11, 2017

(51) Int. Cl.
*G01M 3/28* (2006.01)
*H04W 4/02* (2018.01)
(Continued)

(52) U.S. Cl.
CPC .......... *G01M 3/2815* (2013.01); *G01N 17/00* (2013.01); *H04W 4/025* (2013.01); *H04W 4/70* (2018.02)

(58) Field of Classification Search
None
See application file for complete search history.

(56) References Cited

U.S. PATENT DOCUMENTS

2006/0075210 A1* 4/2006 Manohar ................ G01D 21/00
                                                                          712/36
2008/0176713 A1* 7/2008 Olivera Brizzio .......... A63B 21/0628
                                                                          482/8

(Continued)

OTHER PUBLICATIONS

Vahid Zibakalam, A New TDMA Scheduling Algorithm for Data Collection over Tree-Based Routing in Wireless Sensor Networks, vol. 2012, Article ID 864694, 7 pages.*

(Continued)

*Primary Examiner* — Tung S Lau
(74) *Attorney, Agent, or Firm* — Steven M. Shape; Dennemeyer & Associates, LLC

(57) ABSTRACT

The invention provides a method and system for monitoring one or more properties of an asset such as a long distance pipeline using a plurality of mobile sensor nodes. The method includes generating a time-based schedule for the plurality of mobile sensor nodes for monitoring the one or more properties of the asset, wherein the time-based schedule defines a time slot corresponding to a mobile sensor node to perform a data collection operation. The data collection operation is then initiated at a first mobile sensor node of the plurality of mobile sensor nodes based on a first time slot as defined in the time-based schedule. The data collection operation of the first mobile sensor node is then managed based on the time-based schedule and an energy status of the first mobile sensor node. Finally, the data pertaining to the one or more properties of the asset is collected from the plurality of mobile sensor nodes.

7 Claims, 7 Drawing Sheets

(51) Int. Cl.
*H04W 4/70* (2018.01)
*G01N 17/00* (2006.01)

(56) References Cited

U.S. PATENT DOCUMENTS

| | | | | |
|---|---|---|---|---|
| 2011/0190595 A1* | 8/2011 | Bennett | ............. | A61B 1/00016 600/301 |
| 2013/0183924 A1* | 7/2013 | Saigh | .................. | A61K 31/198 455/404.2 |
| 2016/0356665 A1* | 12/2016 | Felemban | ........... | G01M 3/2807 |
| 2017/0135017 A1* | 5/2017 | Seddiq | ................. | H04W 36/30 |
| 2017/0142628 A1* | 5/2017 | Seddiq | ................. | H04W 36/26 |

OTHER PUBLICATIONS

Martin Macuha, Data Collection Method for Mobile Sensor Networks Based on the Theory of Thermal Fields, Published: Jul. 14, 2011, pp. 7188-7203.*

* cited by examiner

METHOD AND SYSTEM FOR PROVIDING A TIME-BASED SCHEDULE FOR MONITORING ONE OR MORE PROPERTIES OF AN ASSET USING A PLURALITY OF MOBILE SENSOR NODES IN A WIRELESS SENSOR NETWORK

FIELD OF THE INVENTION

The invention generally relates to the field of monitoring one or more properties of an asset and performing a data collection operation pertaining to the one or more properties of the asset using a plurality of mobile sensor nodes in a wireless sensor network. More specifically, the invention relates to a method and system for optimizing management of the data collection operation of the plurality of mobile sensor nodes performing the data collection operation.

BACKGROUND OF THE INVENTION

Water pipelines are generally subjected to anomalies such as leakage, bursts and corrosion that can have severe consequences for the environment and the economy. Therefore, in order to ensure the reliability of water pipelines, they must be monitored effectively. Wireless Sensor Networks (WSNs) have emerged as an effective technology for monitoring critical infrastructure such as water, oil and gas pipelines. These WSNs typically employ different type of sensors, such as temperature sensor, pressure sensor, acoustic sensor, flow sensor, and pH sensor for water pipeline monitoring. These sensors generate appropriate electrical signals based on the sensed phenomena. Generally, monitored parameters include temperature, humidity, flow and pressure. Therefore, selecting an appropriate sensor or sensing technique depends on many aspects such as the pipeline material and environment.

In the prior art, the WSNs generally employ a single mobile WSN node that performs the entire monitoring operation of a pipeline. A typical WSN node consists of a sensing subsystem, a processing subsystem, a communication subsystem and a power supply subsystem. The processing subsystem mainly includes a microcontroller and memory processes for storing the sensor data. The WSN node is allowed to move with the water current from the pipeline source down to the pipeline sink where the node is collected and its memory content is copied to a computer. The RF transceiver of the WSN node, which is an important part of communication subsystem receives commands from a central computer and transmits data collected by the static components of the WSN node to the central computer. Moreover, the power for the mobile WSN node is derived from a battery or an energy harvesting (scavenging) device.

Within the pipeline, the mobile WSN node locates measures and logs many events pertaining to the monitoring operation during its long trip within the pipeline. Consequently, the mobile WSN node must be equipped with a large memory size for accommodating the collected information and a long battery life to keep the mobile WSN node alive during its trip through the pipeline.

Moreover, the mobile WSN node must be highly reliable guaranteeing completion of the monitoring operation throughout the entire pipeline distance. In order to achieve this, the mobile WSN node is deployed with a huge physical size at a high cost. The huge size of the mobile WSN node causes the node to get trapped inside the pipeline, thus, blocking the fluid current.

Therefore, in light of the above, there is a need for an improved method and system for monitoring a long-distance pipeline using a plurality of mobile sensor nodes in WSNs.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
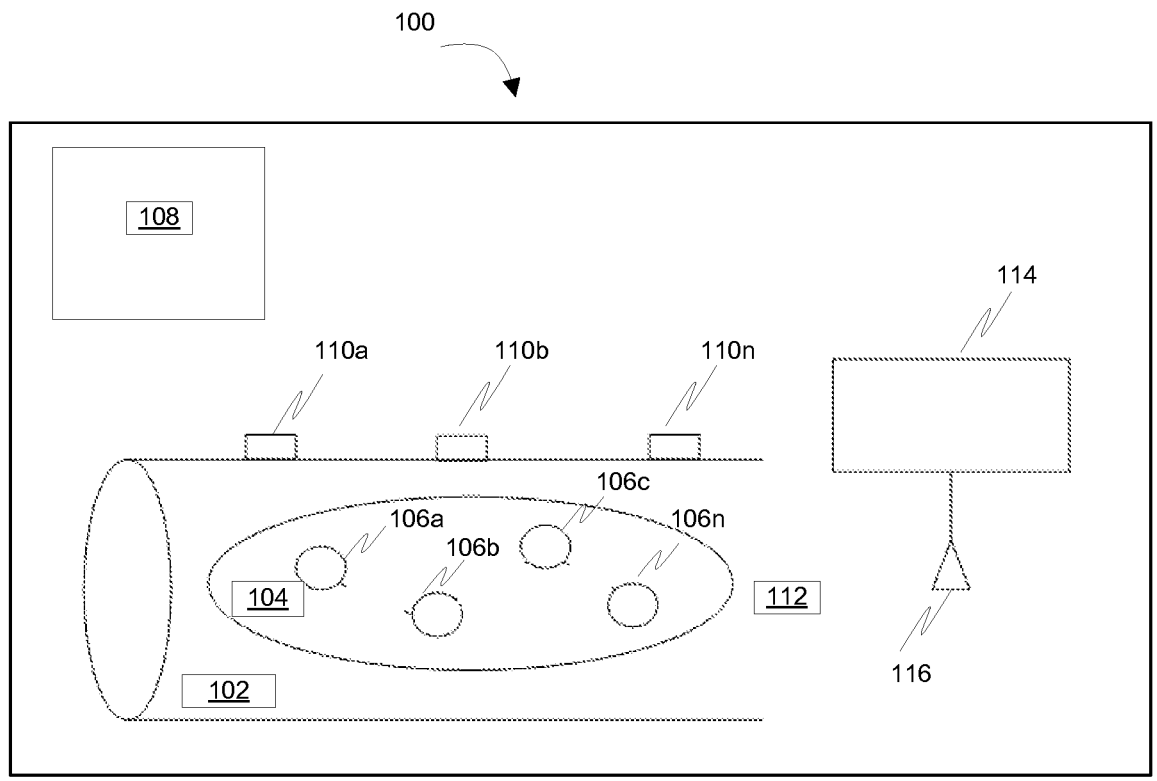
FIG. 1 illustrates a system for monitoring one or more properties of an asset such as a long-distance pipeline in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to monitoring of one or more properties of an asset such as a long-distance pipeline using a plurality of mobile sensor nodes.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for monitoring one or more properties of an asset such as a long-distance pipeline using a plurality of mobile sensor nodes. The method includes generating a time-based schedule for the plurality of mobile sensor nodes for monitoring the one or more properties of the asset, wherein the time-based schedule defines a time slot corresponding to a mobile sensor node to perform a data collection operation. The data collection operation is then initiated at a first mobile sensor node of the plurality of mobile sensor nodes based on a first time slot as defined in the time-based schedule. The method further includes monitoring an energy status of the first mobile sensor node performing the data collection operation based on the time-based schedule. The data collection operation of the first mobile sensor node is then managed based on the time-based schedule and the energy status of the first mobile sensor node. Finally, the data pertaining to the one or more properties of the asset is collected from the plurality of mobile sensor nodes.

FIG. 1 illustrates a system 100 for monitoring one or more properties of an asset such as a long-distance pipeline 102 in accordance with an embodiment of the invention. The one or more properties of pipeline 102 can be, but not limited to, a leakage of pipeline 102, a burst of pipeline 102 and a corrosion of pipeline 102.

As illustrated, system 100 includes a plurality of mobile sensor nodes 106a-106n that flow freely within fluid 104 inside pipeline 102. Plurality of mobile sensor nodes 106a-106n can be configured to sense one or more of, but not limited to, a fluid flow, a fluid pressure and a fluid temperature. Accordingly, plurality of mobile sensor nodes 106a-106n can be one or more of, but not limited to, a temperature sensor node, a pressure sensor node, an acoustic sensor nodes, a flow sensor node and a pH sensor node.

Plurality of mobile sensor nodes 106a-106n are allowed to move with the current of fluid 104 and while doing so, perform a data collection operation pertaining to the one or more properties of pipeline 102. A mobile sensor node performing the data collection operation is said to be in an "active mode" while a mobile sensor node that has not initiated the data collection operation is said to be in an "inactive mode" or "sleeping mode. An "active mode" refers to a state when a mobile sensor node is powered-on whereas an "inactive mode" refers to a state when a mobile sensor node is in a partially powered-down state. Generally, only a single mobile sensor node is active at a point in time.

Each mobile sensor node of plurality of mobile sensor nodes 106a-106n performs the data collection operation based on a time-based schedule and an energy status of the mobile sensor node. The energy status can be associated with one or more of, but not limited to, a battery status indicating the remaining battery capacity of the mobile sensor node and a memory size of the mobile sensor node.

System 100 includes a time-based schedule generator 108 that generates the time-based schedule for plurality of mobile sensor nodes 106a-106n for performing the data collection operation. The time-based schedule defines a specific time slot for each mobile sensor node of plurality of mobile sensor nodes 106a-106n to perform the data collection operation. The time slots for each mobile sensor node may be pre-programmed in such a way that each mobile sensor node is allocated consecutive time slots for performing the data collection operation.

Further, each mobile sensor node of plurality of mobile sensor nodes 106a-106n is equipped with various components for enabling the mobile sensor node to perform the data collection operation based on the time slot and the energy status of the mobile sensor node. The various components are further described in detail in conjunction with FIG. 2.

In addition, system 100 also includes a plurality of location tracking units 110a-110n deployed across outer surface of pipeline 102. Plurality of location tracking components 110a-110n, can be, but not limited to, radio frequency identifier (RFID) tags. Plurality of location tracking units 110a-110n track location of each mobile sensor node of plurality of mobile sensor nodes 106a-106n in pipeline 102 and communicate the location information to the mobile sensor node.

After performing the data collection operation, each mobile sensor node shuts down all the components and goes into a "cut-off mode". A "cut-off mode" refers to a state when a mobile sensor node, after completing the data collection operation, is completely powered-off and does not wake up until it reaches pipeline sink 112.

On reaching pipeline sink 112, plurality of mobile sensor nodes 106a-106n dump the collected data in a data collector 114. Plurality of mobile sensor nodes 106a-106n communicate with data collector 114 through a wireless communication network means 116. Wireless communication network means 116, can be, but not limited to, a Wi-Fi antenna for receiving the data collected from plurality of mobile sensor nodes 106a-106n. The data collected by data collector 114, is then, subjected to an offline analysis to identify the one or more properties associated with pipeline 102.

Figure 2:
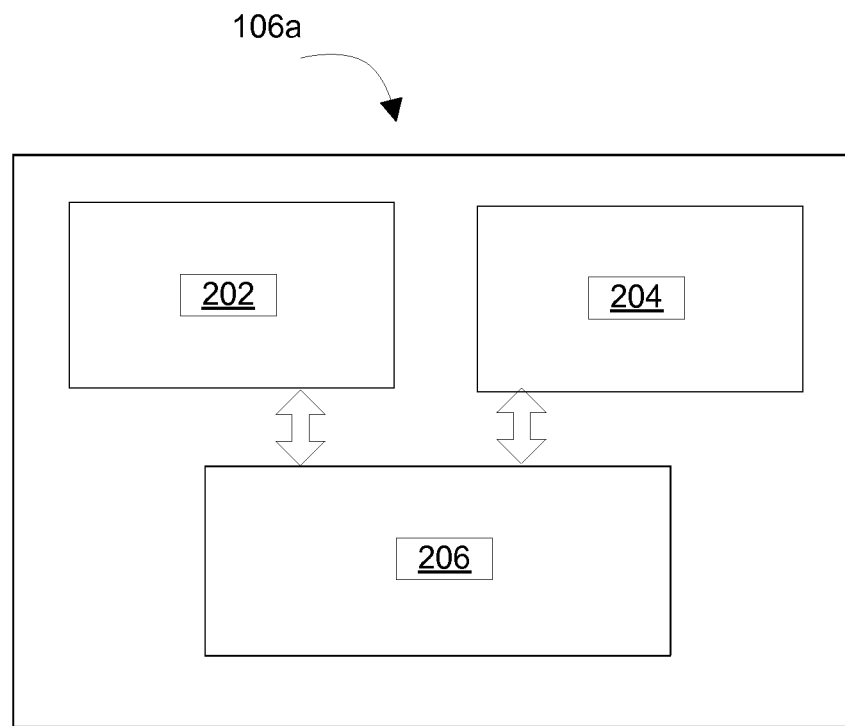
FIG. 2 illustrates various components present within a mobile sensor node for enabling the mobile sensor node to perform the data collection operation pertaining to one or more properties of a long-distance pipeline in accordance with an embodiment of the invention.

FIG. 2 illustrates various components present within mobile sensor node 106a for enabling mobile sensor node 106a to perform the data collection operation pertaining to the one or more properties of pipeline 102 in accordance with an embodiment of the invention.

As illustrated, mobile sensor node 106a includes a memory 202, an energy status monitor 204 and a processor 206.

Energy status monitor 204 is configured to continuously monitor an energy status of mobile sensor node 106a while mobile sensor node 106a is performing the data collection operation. The energy status corresponds to one or more of, but not limited to, a battery status and an available memory size of mobile sensor node 106a.

Processor 206 is communicatively coupled to memory 202, energy status monitor 204 and time-based schedule generator 108.

In accordance with an embodiment of the invention, mobile sensor node 106a is currently in an active mode while remaining mobile sensor nodes 106b-106n of plurality of mobile sensor nodes 106a-106n are in an inactive mode.

Processor 206 initiates the data collection operation at mobile sensor node 106a based on the time slot defined in time-based schedule generator 108 for mobile sensor node 106a.

While mobile sensor node 106a is performing the data collection operation, energy status monitor 204 that is continuously monitoring the energy status of mobile sensor node 106a communicates the energy status to processor 206. Processor 206, then, manages the data collection operation of mobile sensor node 106a based on the time slot and the energy status of mobile sensor node 106a as follows.

Processor 206 checks the energy status of mobile sensor node 106a communicated to processor 206 against an energy threshold. The energy threshold can be, but not limited to, a minimum value of energy required for mobile sensor node 106a to perform the data collection operation. The energy threshold may be predefined for each mobile sensor node of plurality of mobile sensor nodes 106a-106n based on one or more of, but not limited to, a battery status and an available memory size for the mobile sensor node.

When the energy status of mobile sensor node 106a is more than the energy threshold, processor 206 allows mobile sensor node 106a to continue performing the data collection operation even after the time slot defined for mobile sensor node 106a lapses. Also, this extension may result in an overlap with a time slot defined for another mobile sensor node for performing the data collection operation. On the other hand, when the energy status of mobile sensor node 106a is less than the energy threshold, processor 206 is configured to allow mobile sensor node 106a to stop the data collection operation before the time slot defined for mobile sensor node 106a to perform the data collection operation lapses.

Meanwhile, the data collection operation is also initiated at another mobile sensor node 106b based on a time slot as defined in the time-based schedule for mobile sensor node 106b.

Processor 206, then, stores the data collected in memory 202 of mobile sensor node 106a.

Further, processor 206 receives location information of mobile sensor node 106a from plurality of location tracking units 110a-110n. The location information is then utilized by processor 206 to store the data collected with one or more of a time stamp and a location stamp in memory 202.

Thus, each mobile sensor node of plurality of mobile sensor nodes 106a-106n awakens at the start of a corresponding time slot as defined in the time-based schedule for the mobile sensor node and starts performing the data collection operation based on the corresponding time slot and energy status of the mobile sensor node.

After performing the data collection operation, mobile sensor node 106a shuts down all the components and goes into the cut-off mode until it reaches pipeline sink 112. At pipeline sink 112, mobile sensor node 106a dumps the data in data collector 114 using wireless communication network means 116.

Figure 3:
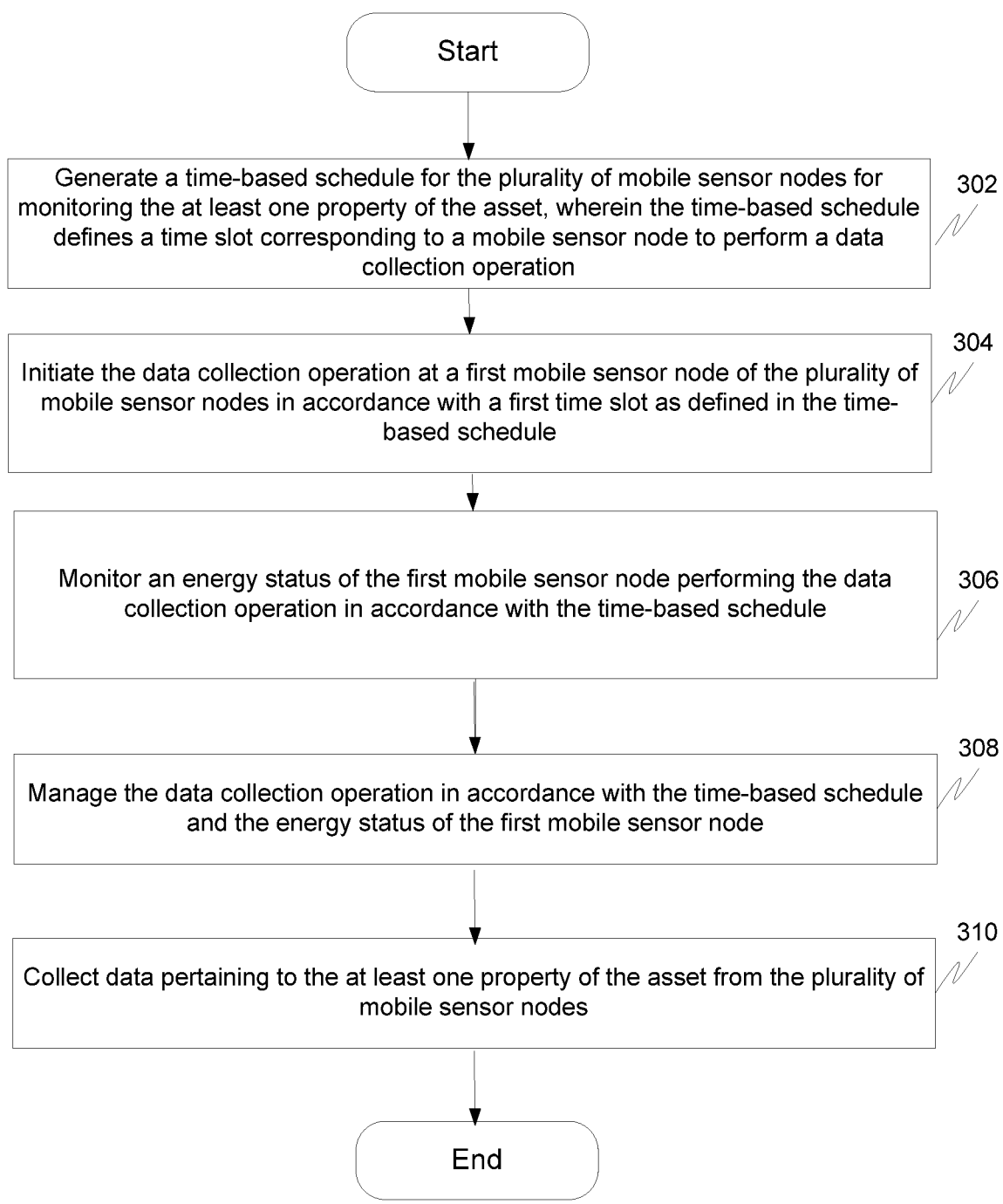
FIG. 3 illustrates a flowchart of a method for monitoring one or more properties of a long-distance pipeline using a plurality of mobile sensor nodes in accordance with an embodiment of the invention.

FIG. 3 illustrates a flowchart of a method for monitoring the one or more properties of pipeline 102 using plurality of mobile sensor nodes 106a-106n in accordance with an embodiment of the invention.

As step 302, a time-based schedule is generated for plurality of mobile sensor nodes 106a-106n for monitoring the one or more properties of pipeline 102. The time-based schedule defines a time slot corresponding to each mobile sensor node for performing a data collection operation. Moving on, at step 304, the data collection operation is initiated at mobile sensor node 106a of plurality of mobile sensor nodes 106a-106n based on the time slot defined in the time-based schedule for mobile sensor node 106a. While mobile sensor node 106a is performing the data collection operation based on the time slot, at step 306, an energy status of mobile sensor node 106a is monitored and communicated to processor 206 of mobile sensor node 106a. Thereafter, at step 308, the data collection operation of mobile sensor node 106a is managed based on the time slot and the energy status of mobile sensor node 106a. Step 308 is further described in detail in conjunction with FIG. 4.

Once the data pertaining to the one or more properties of pipeline 102 is collected by plurality of mobile sensor nodes 106a-106n, at step 310, the collected data is dumped in data collector 114 when plurality of mobile sensor nodes 106a-106n reach pipeline sink 112.

Figure 4:
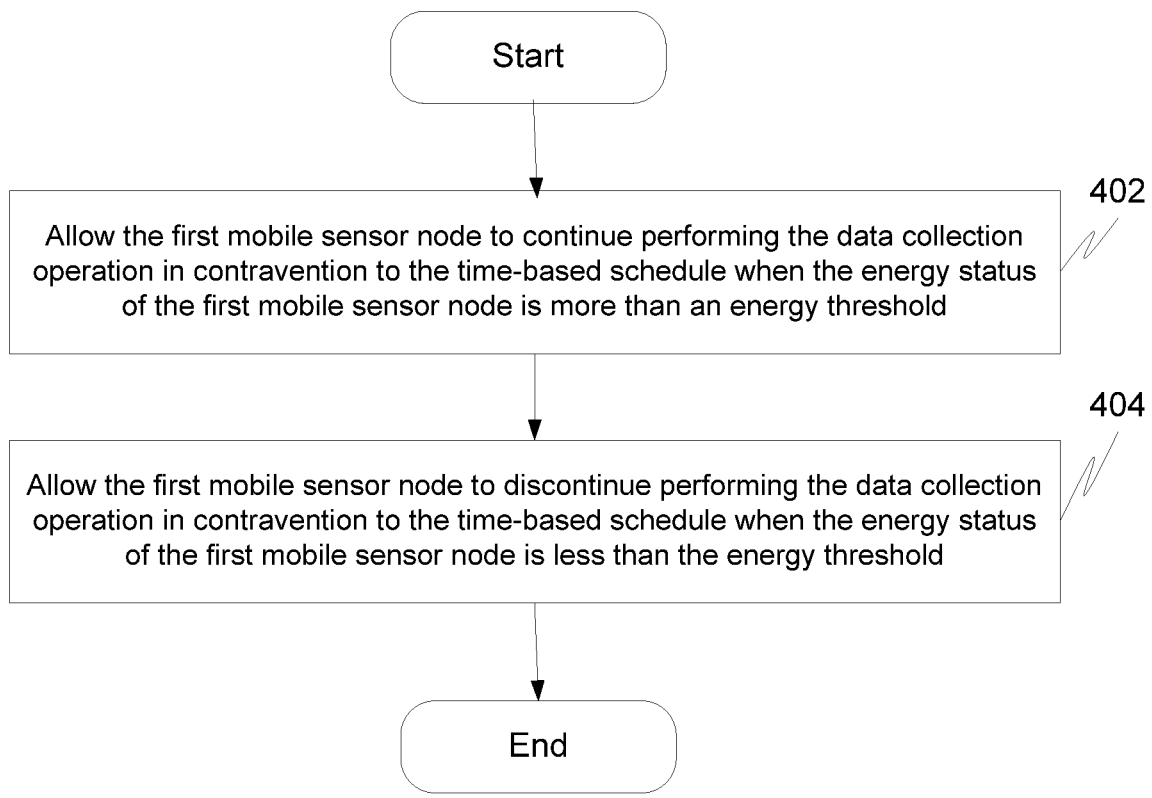
FIG. 4 illustrates a flowchart of a method for managing a data collection operation of a mobile sensor node in accordance with an embodiment of the invention.

FIG. 4 illustrates a flowchart of a method for managing the data collection operation of mobile sensor node 106a in accordance with an embodiment of the invention.

On receiving the energy status of mobile sensor node 106a at processor 206, the energy status of mobile sensor node 106a is checked with an energy threshold. The energy threshold can be, but not limited to, a minimum value of energy required for mobile sensor node 106a to perform the data collection operation. The energy threshold may be predefined for each mobile sensor node of plurality of mobile sensor nodes 106a-106n based on one or more of, but not limited to, a battery status and an available memory size for the mobile sensor node.

At step 402, when the energy status of mobile sensor node 106a is more than the energy threshold, mobile sensor node 106a is allowed to continue performing the data collection operation beyond the time slot defined for mobile sensor node 106a. On the other hand, at step 404, when the energy status of mobile sensor node 106a is less than the energy threshold, mobile sensor node 106a is allowed to stop the data collection operation before mobile sensor node 106a completes the data collection operation before the time slot defined for mobile sensor node 106a to perform the data collection operation lapses.

Meanwhile, the data collection operation is also initiated at another mobile sensor node 106b based on a time slot as defined in the time-based schedule for mobile sensor node 106b.

Thus, each mobile sensor node of plurality of mobile sensor nodes 106a-106n awakens at the start of corresponding time slot as defined in the time-based schedule for the mobile sensor node and starts performing the data collection operation based on the energy status and the corresponding time slot of the mobile sensor node.

The method and system are further described in detail in accordance with an exemplary embodiment of the invention.

Figure 5A:
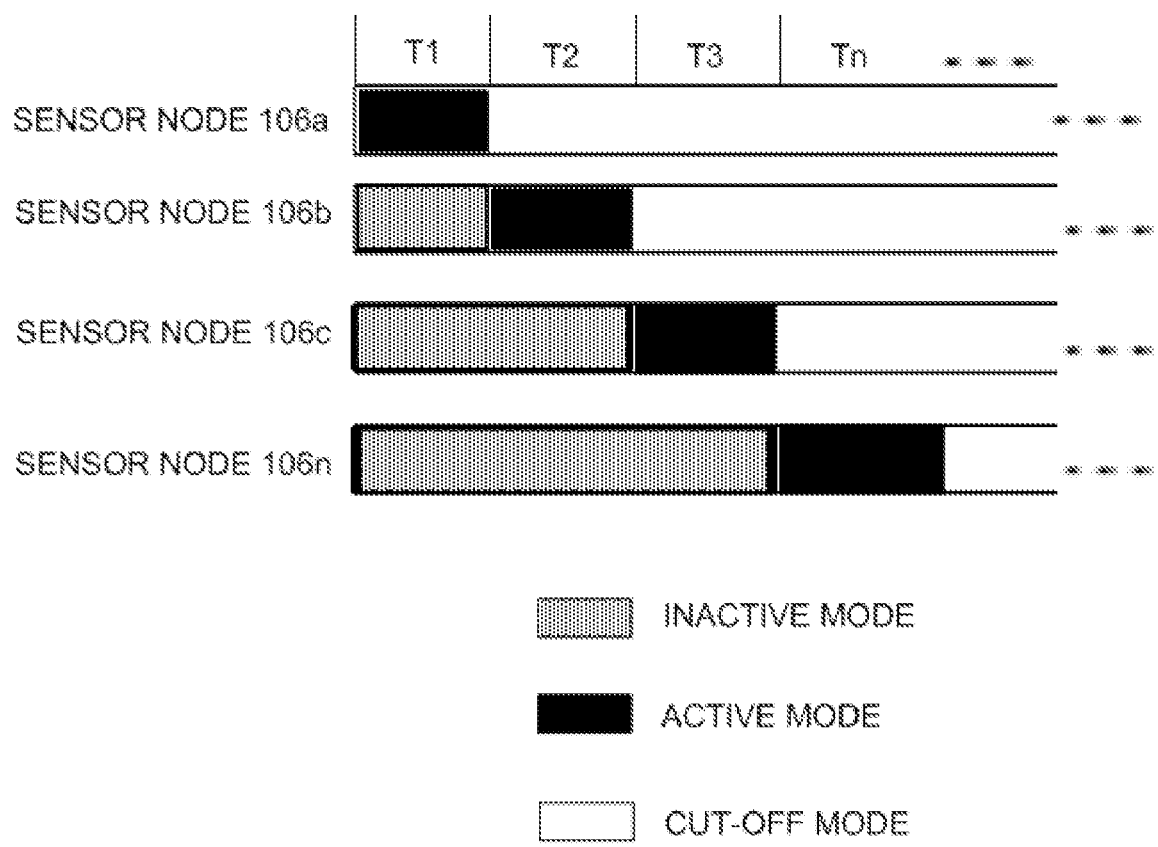
FIG. 5a illustrates a time-based schedule for managing a data collection operation of a plurality of mobile sensor nodes in accordance with an exemplary embodiment of the invention.

FIG. 5a illustrates a time-based schedule for managing the data collection operation of plurality of mobile sensor nodes 106a-106n in accordance with the exemplary embodiment of the invention.

As illustrated in FIG. 5a, each mobile sensor node is pre-programmed with an internal timer to wake up from an inactive mode to an active mode at the start of a time slot for performing the data collection operation. For example, mobile sensor node 106a is pre-programmed to wake up at the start of time slot T1, mobile sensor node 106b is pre-programmed to wake up at the start of time slot T2, mobile sensor node 106c is pre-programmed to wake up at the start of time slot T3 and so on. The pre-programming is done in such a way that the end of time slot T1 is the same as the start of time slot T2.

In a typical scenario, mobile sensor node 106a, that is currently active, continuously measures and logs readings pertaining to the one or more properties of pipeline 102 based on time slot T1. At the end of time slot T1, mobile sensor node 106a stops performing the data collection operation. For the remainder of time slots T2-T3 and T3-Tn, mobile sensor node 106a shuts down all the components and goes into the cut-off mode.

Simultaneously, at the start of time slot T2 which corresponds to the end of time slot T1, mobile sensor node 106b wakes up from the inactive mode as indicated by the internal timer within mobile sensor node 106*b* and starts performing the data collection operation based on time slot T2.

Similarly, mobile sensor node 106*b* stops performing the data collection operation at the end of time slot T2 while mobile sensor node 106*c* wakes up at the start of time slot T3 and starts performing the data collection operation based on time slot T3 as indicated by the internal timer within mobile sensor node 106*c*.

Thus, each mobile sensor node of plurality of mobile sensor nodes 106*a*-106*n* that are in an inactive mode are pre-programmed to wake up after a certain period of time to perform the data collection operation and then to stop performing the data collection operation after another period of time.

Figure 5B:
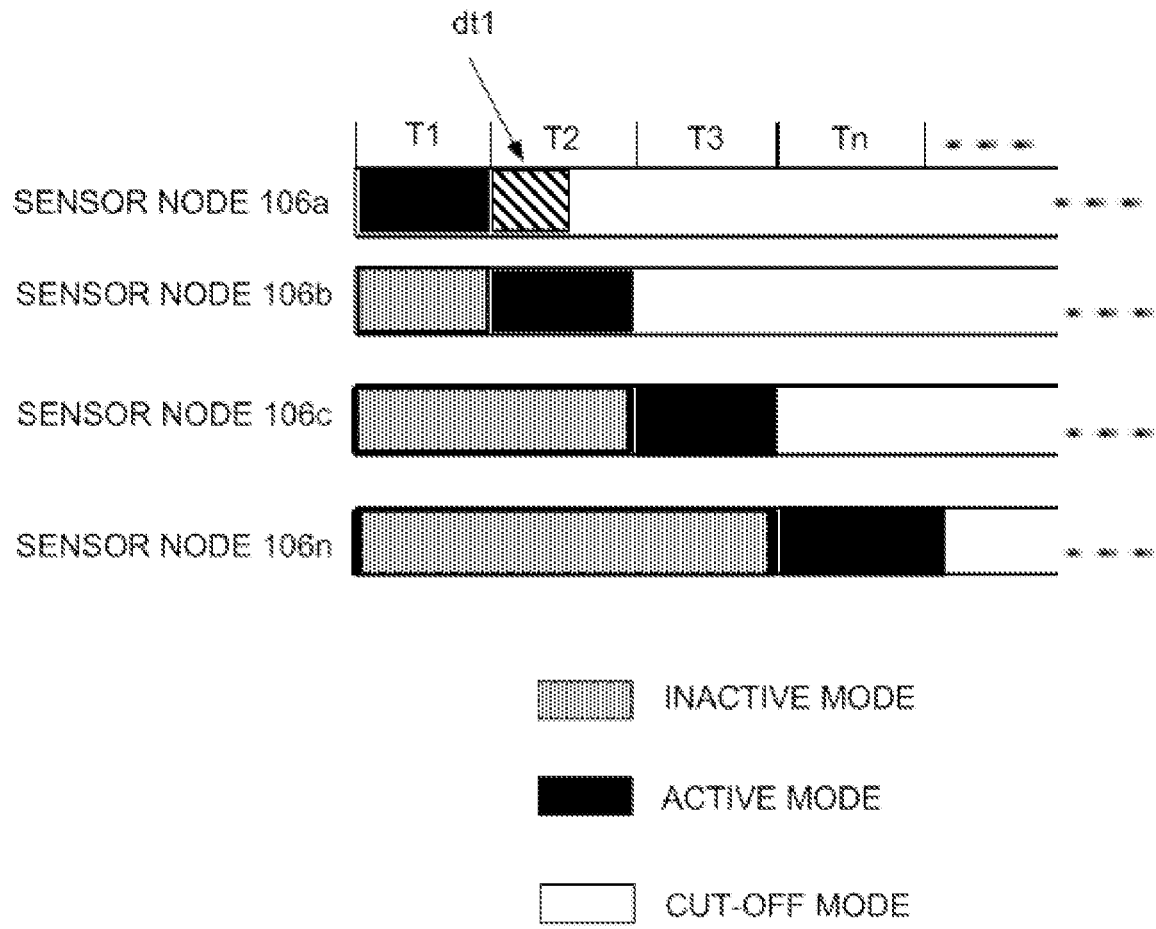
FIGS. 5b and 5c illustrate managing a data collection operation for a plurality of mobile sensor nodes based on an energy status and time-based schedule in accordance with an exemplary embodiment of the invention.

However, in accordance with the invention, when mobile sensor node 106*a* has enough energy and memory to operate beyond time slot T1, mobile sensor node 106*a* continues performing the data collection operation for a time slot dt1 even after time slot T1 lapses as illustrated in FIG. 5*b*. The extended time slot dt1 may result in an overlap with time slot T2 of mobile sensor node 106*b* for performing the data collection operation.

Figure 5C:
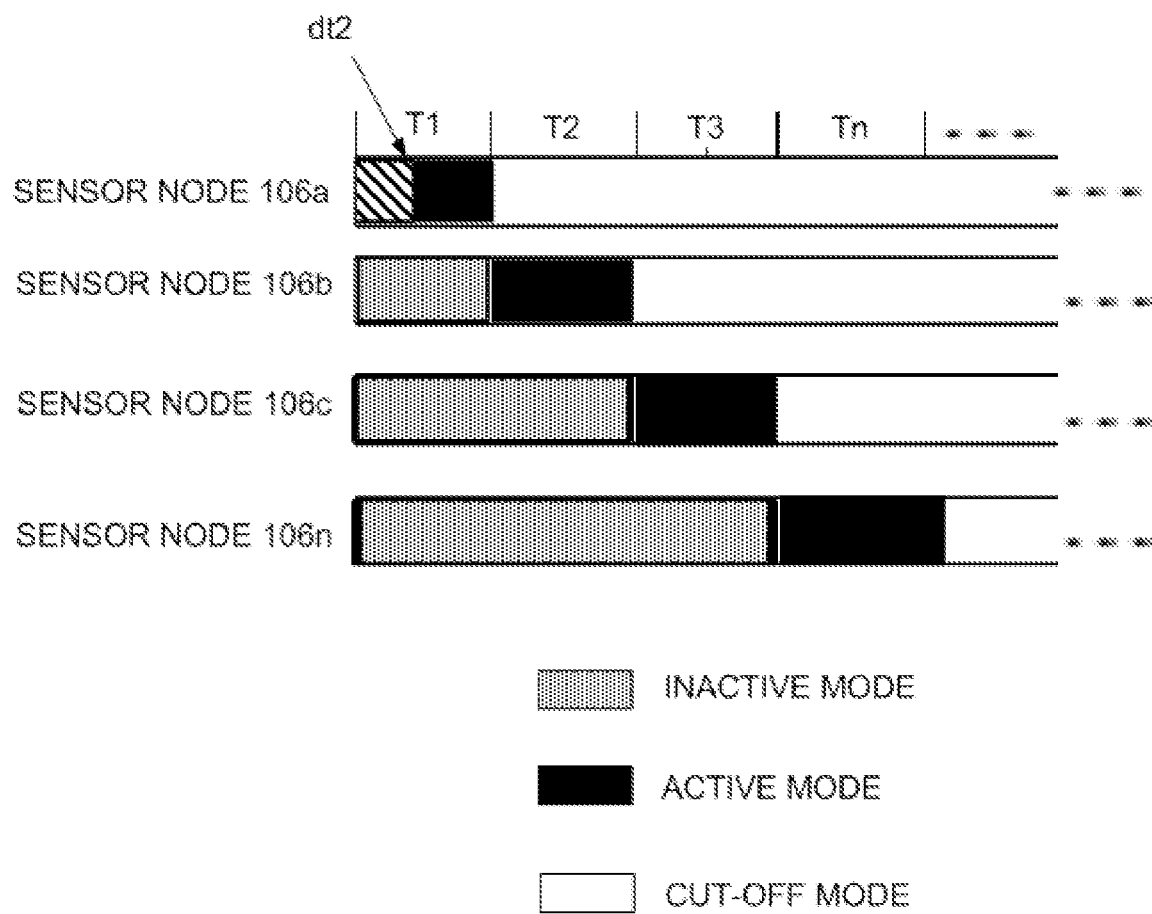

On the other hand, when mobile sensor node 106*a* does not enough energy to complete the data collection operation based on time slot T1, mobile sensor node 106*a* stops performing the data collection operation at the start of time slot dt2 before time slot T1 lapses as illustrated in FIG. 5*c*. As usual, mobile sensor node 106*b* wakes up at the start of time slot T2 and starts performing the data collection operation based on time slot T2 and the energy status of mobile sensor node 106*b*.

Once each mobile sensor node of plurality of mobile sensor nodes 106*a*-106*n* has completed the data collection operation, the mobile sensor node completely shuts down all components including the internal timer and goes into the cut-off mode and will never wake up again until plurality of mobile sensor nodes 106*a*-106*n* reach pipeline sink 112.

Finally, at pipeline sink 112, plurality of mobile sensor nodes 106*a*-106*n* dump the data collected at data collector 114 using wireless communication network means 116.

Various advantages provided by the invention are outlined below.

The invention helps in reducing a memory size of each mobile sensor node as each mobile sensor node is configured to perform the data collection operation only for a certain period of time based on the energy status of the mobile sensor node and not for the entire length of the pipeline. Hence, each mobile sensor node can have a smaller battery and memory size that significantly reduces the overall physical size of the mobile sensor node, thus, reducing the risk of the mobile sensor node getting trapped inside the pipeline.

Also, the invention reduces risk due to faulty mobile sensor nodes as the invention deploys multiple mobile sensor nodes for the monitoring and data collection operations. Thus, a faulty mobile sensor node that is performing the data collection operation only misses measurements during the data collection operation that fall during its pre-programmed time slot while the data collection operations for the rest of the pipeline are taken care of by the remaining active mobile sensor nodes. Thus, the invention enhances coverage for monitoring as well as system reliability.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A system for monitoring at least one property of an asset, the system comprising:
   a plurality of mobile sensor nodes, each mobile sensor node of the plurality of mobile sensor nodes configured to perform a data collection operation pertaining to the at least one property when in an active mode as each mobile sensor node moves with respect to the asset;
   a time-based schedule generator configured to generate a time-based schedule for the plurality of mobile sensor nodes for monitoring the at least one property of the asset, wherein the time-based schedule defines a time slot corresponding to a first mobile sensor node of the plurality of mobile sensor nodes to perform the data collection operation in the active mode, wherein the first mobile sensor node comprises:
   a memory;
   an energy status monitor configured to monitor an energy status of the first mobile sensor node; and
   a processor communicatively coupled with the time-based schedule generator, the energy status monitor, and the memory, wherein the processor is configured to:
   initiate the data collection operation at the first mobile sensor node in accordance with a time slot as defined in the time-based schedule; and
   manage the data collection operation of the first mobile sensor node in accordance with the time-based schedule and the energy status of the first mobile sensor node; and
   a data collector configured to collect data pertaining to the at least one property of the asset from the plurality of mobile sensor nodes.

2. The system according to claim 1, wherein the processor is configured to:
   allow the first mobile sensor node to continue performing the data collection operation in contravention to the time-based schedule when the energy status of the first mobile sensor node is more than an energy threshold; and
   allow the first mobile sensor node to discontinue performing the data collection operation in contravention to the time-based schedule when the energy status of the first mobile sensor node is less than the energy threshold.

3. The system according to claim 1, wherein the processor is configured to store data pertaining to the at least one property of the asset with at least one of a time stamp and a location stamp in the memory of the first mobile sensor node.

4. The system according to claim 1 further comprises a plurality of location tracking units, wherein the plurality of location tracking units are deployed across the asset.

5. The system according to claim 1, wherein the data collector collects data pertaining to the at least one property of the asset from the plurality of mobile sensor nodes through a wireless communication network.

6. The system according to claim 4, wherein the plurality of location tracking units track location of each mobile sensor node of the plurality of mobile sensor nodes with respect to the asset.

7. The system according to claim 6, wherein the plurality of location tracking units communicate location information of the first mobile sensor node to the processor of the first mobile sensor node through a wireless communication network.

* * * * *